(12) United States Patent
Matthews et al.

(10) Patent No.: US 11,282,062 B2
(45) Date of Patent: Mar. 22, 2022

(54) SYSTEM AND METHOD PROVIDING CHECKOUT AUTHENTICATION USING TEXT MESSAGING

(71) Applicant: Walmart Apollo, LLC, Bentonville, AR (US)

(72) Inventors: Mark Matthews, Rogers, AR (US); Daniel Eckert, Rogers, AR (US); Sid Shake, Rogers, AR (US); Charles Lobo, Cave Springs, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 39 days.

(21) Appl. No.: 16/116,635

(22) Filed: Aug. 29, 2018

(65) Prior Publication Data
US 2019/0066088 A1 Feb. 28, 2019

Related U.S. Application Data

(60) Provisional application No. 62/551,991, filed on Aug. 30, 2017.

(51) Int. Cl.
*G06Q 20/32* (2012.01)
*G06Q 20/18* (2012.01)
(Continued)

(52) U.S. Cl.
CPC ......... *G06Q 20/3255* (2013.01); *G06F 21/31* (2013.01); *G06F 21/41* (2013.01);
(Continued)

(58) Field of Classification Search
None
See application file for complete search history.

(56) References Cited

U.S. PATENT DOCUMENTS 7,392,388 B2 6/2008 Keech
8,453,923 B2 6/2013 Henry et al.
(Continued)

FOREIGN PATENT DOCUMENTS

| WO | 2012004640 A1 | 1/2012 |
| WO | 2017072647 A1 | 5/2017 |

OTHER PUBLICATIONS

D. Patil and S. K. Guru, "Secured authentication using challenge-response and quick-response code for Android mobiles," International Conference on Information Communication and Embedded Systems (ICICES2014), 2014, pp. 1-4, doi: 10.1109/ICICES.2014.7033865. (Year: 2014).*

(Continued)

*Primary Examiner* — Gregory S Cunningham, II
(74) *Attorney, Agent, or Firm* — Duane Morris LLP; Manita Rawat

(57) ABSTRACT

Systems, methods, and computer-readable storage media configured according to this disclosure provide money services on a money services device such as a kiosk device, tablet device, mobile device, virtual reality device, mixed reality device and the like. An application runs on the money services device and communicates with remote services to perform profile management functions such as facilitating account log-in and allowing users to log-in using mobile messaging. Other services such as verifying the user's ID via an account management service may also be provided.

8 Claims, 3 Drawing Sheets

(51) Int. Cl.
*G06F 21/31* (2013.01)
*G06Q 20/40* (2012.01)
*G06F 21/41* (2013.01)

(52) U.S. Cl.
CPC .......... *G06Q 20/18* (2013.01); *G06Q 20/322* (2013.01); *G06Q 20/401* (2013.01)

(56) References Cited

U.S. PATENT DOCUMENTS

| | | | |
|---|---|---|---|
| 8,718,684 B2 | 5/2014 | Ellis | |
| 9,298,901 B1 * | 3/2016 | Boss | G06F 21/31 |
| 10,482,223 B1 * | 11/2019 | Sokolov | G06F 21/31 |
| 2008/0296392 A1 | 12/2008 | Connell, II et al. | |
| 2012/0216260 A1 * | 8/2012 | Crawford | G06F 21/31 |
| | | | 726/5 |
| 2012/0290421 A1 | 11/2012 | Qawami et al. | |
| 2012/0303425 A1 | 11/2012 | Katzin et al. | |
| 2013/0144663 A1 | 6/2013 | Qawami et al. | |
| 2014/0310116 A1 | 10/2014 | Prellwitz et al. | |
| 2015/0088746 A1 * | 3/2015 | Hoffman | G06Q 20/40145 |
| | | | 705/44 |
| 2015/0106216 A1 * | 4/2015 | Kenderov | G06Q 20/409 |
| | | | 705/21 |
| 2015/0186892 A1 * | 7/2015 | Zhang | G06Q 20/4016 |
| | | | 705/44 |
| 2016/0042336 A1 * | 2/2016 | Tajima | G07G 1/14 |
| | | | 705/21 |
| 2017/0193498 A1 | 7/2017 | Metral et al. | |
| 2018/0107992 A1 * | 4/2018 | Al-Bedaiwi | G06Q 20/12 |

OTHER PUBLICATIONS

International Search Report and Written Opinion dated Nov. 1, 2018, issued in corresponding PCT International Application No. PCT/US2018/048615.

"WooCommerce Social Login", WooCommerce, accessed Jun. 9, 2017 (15 pp).

* cited by examiner

SYSTEM AND METHOD PROVIDING CHECKOUT AUTHENTICATION USING TEXT MESSAGING

CROSS-REFERENCE TO RELATED APPLICATIONS

This application claims priority of U.S. Provisional Patent Application No. 62/551,991 filed Aug. 30, 2017, which is incorporated herein by reference in its entirety for all purposes.

BACKGROUND

1. Technical Field

The present disclosure relates to providing checkout authentication using text messaging.

2. Introduction

Money services such as "Send Money," "Pay a Bill," or "Cash a Check" may be offered in a retail store environment. The services may be offered at a point of sale terminal, such as a check-out register, or at a non-point of sale terminal, such as a stand alone kiosk. Typical checkout systems used for money services do not have a method for customer authentication in order for the customer to pull up their historical data. The systems that do have authentication provide it in the form of letting the customer login with their account ID manually on the checkout system. If the customer wants to use the checkout system they need to login using their account ID. This system and method has several drawbacks. It is difficult to enter the account ID and password on a checkout system; the input devices and display are not accommodating for this type of function. In addition, the prior approach has privacy issues. The cashier and other customers in the vicinity may see the account number and password.

There is a need for a profile management system and method that provides profile management functionality with a more effiencet system and that address the shortcomings of prior systems.

SUMMARY

A system according to embodiments of the invention may comprise a profile management service storing mobile phone numbers for customers in a table, with an account ID associated with each mobile phone number in the table, and the account ID is associated with a respective account for the respective customer; and a money services device for a financial transaction remote from the profile management device and configured to present money service options to a customer, receive a selected option, and present a checkout ID and a destination to the customer, the profile management service may be cross referenced The mobile phone number in the table to the user ID associated with the customer's account and generating challenge questions based on information in the associated customers' account; receiving response to the challenge questions, and logging the user into the account when the responses are verified.

A method for performing concepts disclosed herein can include: presenting a number of available services to the customer via a kiosk; receiving a selection of the options and displaying a unique checkout ID and a destination at the kiosk; receiving the unique checkout ID along with phone number at the destination; parsing the phone number from the message and sending it to the profile management module; cross referencing at a profile management module the phone number to the customer's account ID; determining challenge questions based on account information and sending challenge/security questions to the kiosk with the unique checkout ID that was sent in the original message; displaying to the challenge/security questions and receiving response at the kiosk; and logging the customer in with their account ID when responses are verified.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

DETAILED DESCRIPTION

Systems, methods, and computer-readable storage media configured according to this disclosure provide money services on a money services device such as a kiosk device, tablet device, mobile device, virtual reality device, mixed reality device and the like. An application runs on the money services device and communicates with remote services to perform profile management functions such as facilitating account log-in and allowing users to log-in using mobile messaging. Other services such as verifying the user's ID via an account management service may also be provided.

Embodiments of the invention leverage remotely hosted services, for example services hosted on the Cloud, to deliver additional profile management functions. There are no current money services solutions which are able to handle log-in via mobile messages. Embodiments of the invention thus provide a new money services system that is able to process log-in via mobile messaging. Services are modularized and hosted remotely from the device conducting the transaction with the customer.

Figure 1:
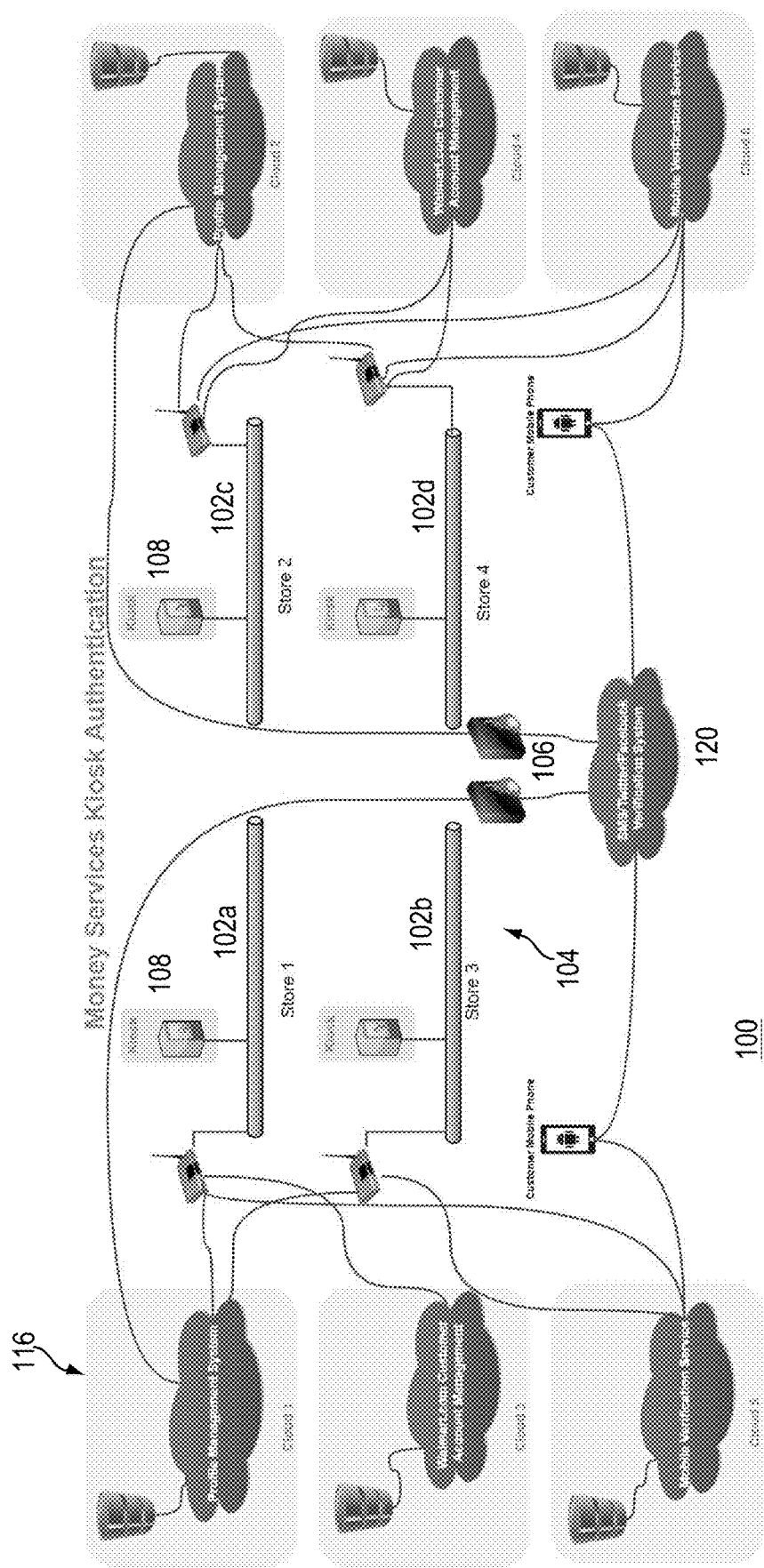
FIG. 1 illustrates an exemplary system.

FIG. 1 illustrates an exemplary system 100 according to embodiments of the invention. The system 100 is described as being deployed in a retail store environment, but is not limited to such an environment. FIG. 1 illustrate four store systems 102a-102d that form a store network 104. The store network 104 is connected to external networks, such as the internet, via firewall 106. A money services device 108 is connected to the store system 102. The money services device 108 may include a customers' mobile phones, kiosks, tablets, mobile phones, virtual reality devices and mixed reality devices and the like. The money service device 108 is described below in an exemplary embodiment as a kiosk in retail stores. A money services application may run on the kiosk 108. The money services application serves as the customers interface with the money services functionality. The kiosk 108 is configured to present menus, options, receive inputs, etc. A customer can select one of the offered services, such as "Send Money," "Pay a Bill," or "Cash a Check" money services on the app.

Remote services may be provided to process a transaction. Here, a cloud based solution 116 is shown. The cloud based solution 116 may include various modules, such as a profile management system (cloud 1), customer account management (cloud 3) and mobile verification (cloud 5). The modules may be separate from each other or combined in any fashion. The modules provide services to the app running on the kiosk 108. One or more instances of the services may be provided. Here, three clouds 116 are shown, but other numbers are also contemplated. In implementation, hundreds or thousands of stores and money service devices may utilize the remote service. Associated databases may also be provided. The modules may be provided as web services accessed using the REST API.

The kiosk 108 may register to identify itself and inform its availablity to process transactions. The kiosk 108 may communicate via the respective store network with the back-end via a webservice. To register, the kiosk 108 may call a registration webservice. The kiosk 108 may be assigned an unique identifier by the registration service and the location of the kiosk 108 and unique identifier stored in a database upon registration.

As noted above, customers can select one of the offered services, such as "Send Money," "Pay a Bill," or "Cash a Check" money services. When one of the options is selected the app prompts the customer to enter transaction information. As part of the transaction, or even apart from a transaction, a customer may want to view their account information, for example to view historical payment data or other account information. Thus, the app presents a log in option to the customer. As part of the log in function, the kiosk displays a unique ID and a destination where the unique ID should be sent. The destination may be, for example, a SMS Short Code, Twitter handle, Facebook account or the like. The customer may use a mobile phone or other device capable of sending a message in order to send the unique ID along with the device's phone number to the SMS Short Code or Twitter Handle or Facebook account. Another identifier instead of a phone number may also be used.

A service provider 120 associated with the destination receives the message from the mobile phone. The service provider parsing service, such as SMS service provider parsing service or Twitter feed parsing service or Facebook feed parsing service, parses out the phone number or ID from the message. The service provider 120 may be a third party service or a service of the retail store environment. In the example shown, the service provider 120 is arranged outside of the retail store environment, on the other side of firewall 106. The service provider 120 obtains the phone number and sends it to the profile management system.

The profile management system may be a remote or cloud-based part of the store network and manages the customer's profile. There may be hundreds of thousands of customer profiles. The profile may be stored in a database and include information regarding the customer, such as name, address, mobile phone number, etc. In an exemplary embodiment, the mobile phone number is used as a primary key to locate the customer's profile and account. Each customer's account may have a profile associated with it. For example, the mobile phone number may be stored in a table, with an account ID associated with each mobile phone number in the table. The mobile phone number may be cross referenced in the table to the user ID associated with the customer's account. The account may be accessed and managed by the account management service. The account may include information such as transaction history, authorized payment methods, etc. If there is no account associated with the mobile phone number, a notice is sent to the kiosk or in a message to the mobile phone. The message may present an option to the customer to create a profile.

When the appropriate account is located, the information in the account or profile may be accessed. The information in profile and account may be used to verify the users identity. This may be done via challenge and security questions. The mobile phone number may be used to obtain publicly available information regarding the user. Various data sources may mined to obtain information about the individual. Multiple data points may be checked to obtain the same information. Checking multiple data points confirms the accuracy of the information. It is preferable that the different data points be independent from each other.

The data sources may be mined to obtain specific information. For example, the data sources may be mined specifically to obtain the individual's previous address, high school, and mother's maiden name. It is preferable that the answers to the questions are known before the questions are posed to the individual.

Based on the information in the profile and information obtained, the challenge and security questions are generated. In the example above, it may be that only the mother's maiden name and previous address are obtained by the data mining process. As the individual's high school was not located and is not verifiable, the individual is not asked for that information. The individual may be questioned regarding their mother's maiden name and previous address.

The questions are sent to the kiosk 108 associated with the unique ID that was sent in the message from the mobile phone. The customer respond to the challenge/security questions and if they are able to respond to the questions correctly they are logged into the Money Services checkout system with the corresponding ID. The customer may the access the information stored in their account.

Figure 2:
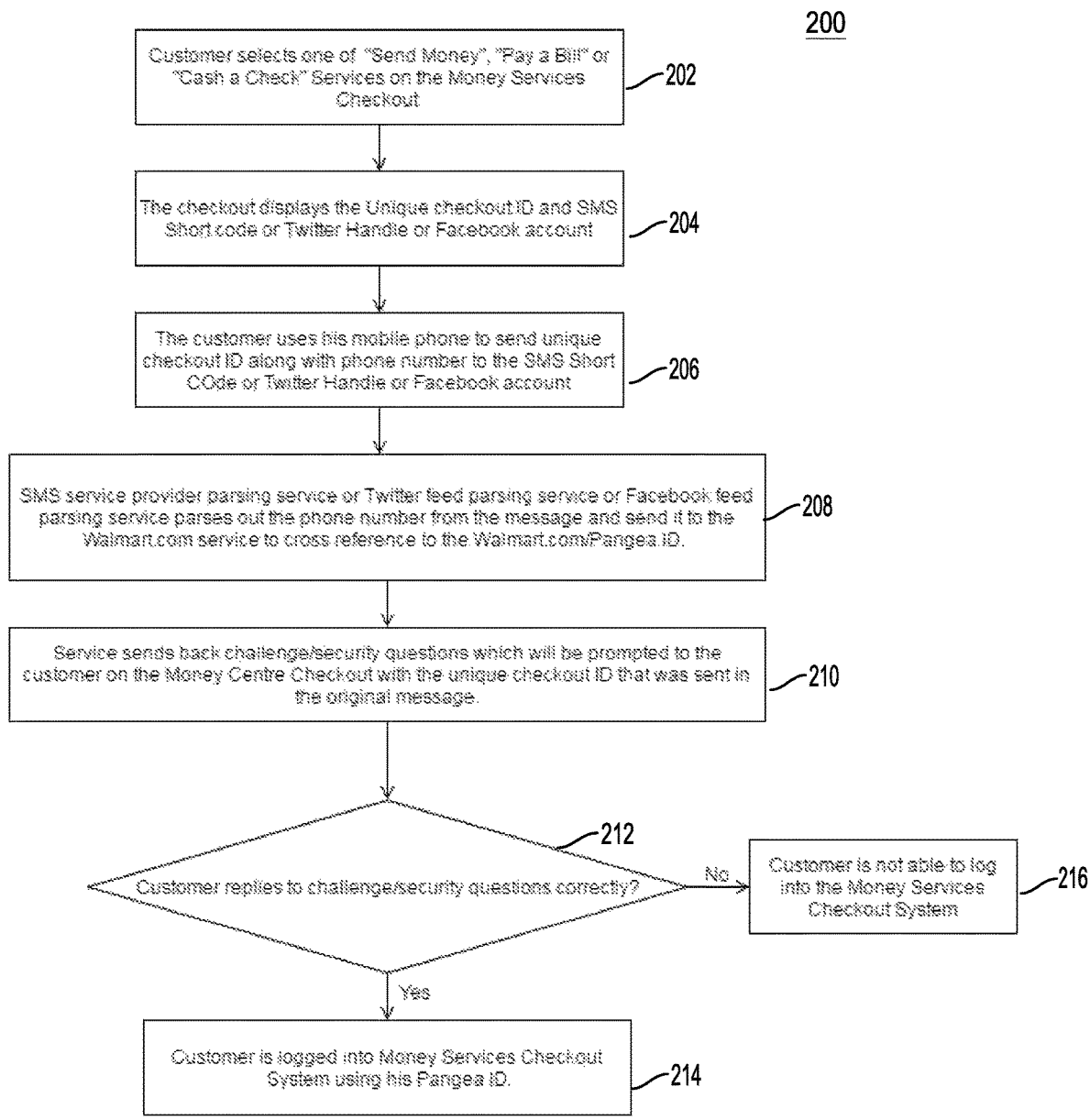
FIG. 2 illustrates an exemplary method.

FIG. 2 illustrates a method 200 that may be performed according to an embodiment of the invention. The customer can access the available money services via the app on the money services device, 202. The app may present a number of available services to the customer. To access money services the customer selects that option on the app, for example via a menu selection or icon. The various money services options available are then presented to the customer. Typical services include "Send Money," "Pay a Bill," or "Cash a Check."

The customer selects one of the options and the kiosk displays a unique checkout ID and the SMS Short Code or Twitter handle or Facebook account, 204. The customer uses their mobile phone to send unique checkout ID along with phone number to the SMS Short Code or Twitter Handle or Facebook account, 206.

The service provider parsing service parses out the phone number from the message and send it to the profile management service to cross reference to the customer's account ID, 208. The profile management service sends back challenge/security questions which will be prompted to the customer on the kiosk with the unique checkout ID that was sent in the original message, 210.

The customer responds to the challenge/security questions and if they is able to respond to the questions correctly, the customer is logged into system with their account ID, 212-216.

Figure 3:
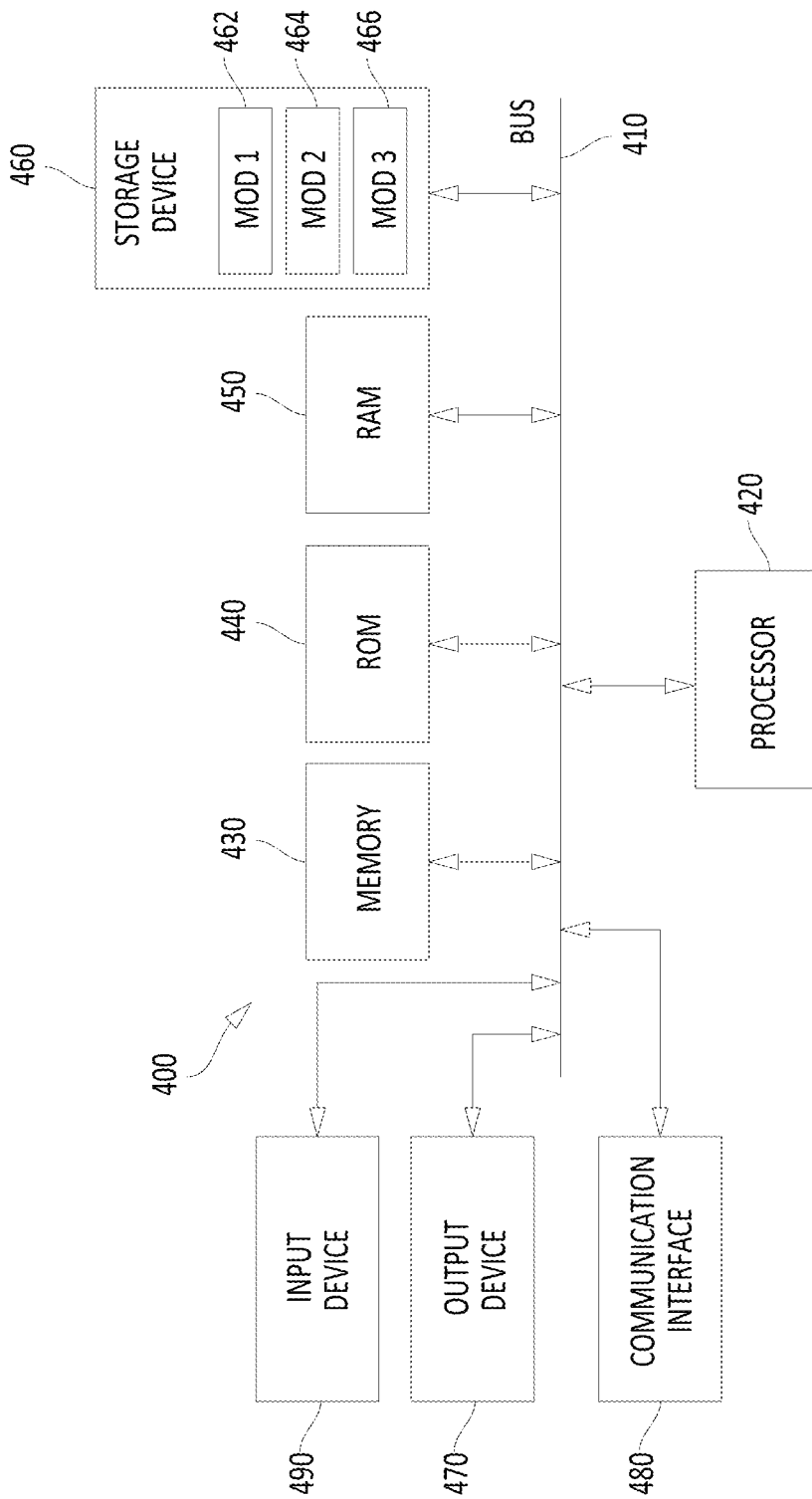
FIG. 3 illustrates an exemplary computer system.

With reference to FIG. 3, an exemplary system 400 can include a processing unit (CPU or processor) 420 and a system bus 410 that couples various system components including the system memory 430 such as read only memory (ROM) 440 and random access memory (RAM) 450 to the processor 420. The system 400 can include a cache of high speed memory connected directly with, in close proximity to, or integrated as part of the processor 420. The system 400 copies data from the memory 430 and/or the storage device 460 to the cache for quick access by the processor 420. In this way, the cache provides a performance boost that avoids processor 420 delays while waiting for data. These and other modules can control or be configured to control the processor 420 to perform various actions. Other system memory 430 may be available for use as well. The memory 430 can include multiple different types of memory with different performance characteristics. It can be appreciated that the disclosure may operate on a computing device 400 with more than one processor 420 or on a group or cluster of computing devices networked together to provide greater processing capability. The processor 420 can include any general purpose processor and a hardware module or software module, such as module 1 462, module 2 464, and module 3 466 stored in storage device 460, configured to control the processor 420 as well as a special-purpose processor where software instructions are incorporated into the actual processor design. The processor 420 may essentially be a completely self-contained computing system, containing multiple cores or processors, a bus, memory controller, cache, etc. A multi-core processor may be symmetric or asymmetric.

The system bus 410 may be any of several types of bus structures including a memory bus or memory controller, a peripheral bus, and a local bus using any of a variety of bus architectures. A basic input/output (BIOS) stored in ROM 440 or the like, may provide the basic routine that helps to transfer information between elements within the computing device 400, such as during start-up. The computing device 400 further includes storage devices 460 such as a hard disk drive, a magnetic disk drive, an optical disk drive, tape drive or the like. The storage device 460 can include software modules 462, 464, 466 for controlling the processor 420. Other hardware or software modules are contemplated. The storage device 460 is connected to the system bus 410 by a drive interface. The drives and the associated computer-readable storage media provide nonvolatile storage of computer-readable instructions, data structures, program modules and other data for the computing device 400. In one aspect, a hardware module that performs a particular function includes the software component stored in a tangible computer-readable storage medium in connection with the necessary hardware components, such as the processor 420, bus 410, display 470, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 400 is a small, handheld computing device, a desktop computer, or a computer server.

Although the exemplary embodiment described herein employs the hard disk 460, other types of computer-readable media which can store data that are accessible by a computer, such as magnetic cassettes, flash memory cards, digital versatile disks, cartridges, random access memories (RAMs) 450, and read only memory (ROM) 440, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 400, an input device 490 represents any number of input mechanisms, such as a microphone for speech, a touch-sensitive screen for gesture or graphical input, keyboard, mouse, motion input, speech and so forth. An output device 470 can also be one or more of a number of output mechanisms known to those of skill in the art. In some instances, multimodal systems enable a user to provide multiple types of input to communicate with the computing device 400. The communications interface 480 generally governs and manages the user input and system output. There is no restriction on operating on any particular hardware arrangement and therefore the basic features here may easily be substituted for improved hardware or firmware arrangements as they are developed.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A system comprising:
   a database, the database associated with a messaging service operated by a social networking platform;
   a processor;
   a network firewall; and
   a non-transitory computer-readable storage medium having instructions stored which, when executed by the processor, cause the processor to perform operations on a first side of the network firewall comprising:
   storing mobile phone numbers for customers in a table in the database, wherein:
      each mobile phone number in the table is associated with an account ID, and
      the account ID is associated with a respective account for a respective customer, resulting in a plurality of accounts; and
   receiving, from a mobile device associated with the mobile phone number, a request via the messaging service to perform a financial transaction on a remotely located money services device, the request via the messaging service purporting to be from a user claiming to have an account in the plurality of accounts,
   the money services device being a remotely located kiosk connected to a first network on a second side of the network firewall, and
   the request containing a unique checkout ID previously displayed by the money services device;
   retrieving, from a plurality of media sources, publicly available information about an owner of an account associated with the mobile phone number of the mobile device, resulting in multisourced user information;
   generating, challenge questions regarding a mother's maiden name of an owner of the account based on (1) information in the account, and (2) the multi-sourced user information;
   transmitting the challenge questions to the money services device;
   receiving, from the money services device, responses to the challenge questions; and
   logging the user into the account when the responses are verified.

2. The system of claim 1, the non-transitory computer-readable storage medium having additional instructions stored which, when executed by the processor, cause the processor to perform operations comprising:
  registering the money services device by associating the money services device with a unique identifier; and
  storing a location of the money services device and the unique identifier stored in the database.

3. The system of claim 2, the non-transitory computer-readable storage medium having additional instructions stored which, when executed by the processor, cause the processor to perform operations comprising:
  when the retrieving, from a plurality of media sources, the publicly available information about the owner of the account reveals no account exists, presenting a registration option to the user.

4. The system of claim 1, the non-transitory computer-readable storage medium having additional instructions stored which, when executed by the processor, cause the processor to perform operations comprising:
  entering a mobile phone number associated with the money services device in a table, where accounts associated with each money service device in a plurality of money service devices stored in the table.

5. A method, comprising:
  presenting a number of available services to a customer via a kiosk, the kiosk being connected to a first network having a firewall;
  receiving, at the kiosk from a mobile device associated with the customer via a messaging service operated by a social networking platform, a selection of a financial transaction on the kiosk from the number of available services;
  assigning a unique checkout ID to the financial transaction;
  displaying, at the kiosk, in association with the selection, the unique checkout ID and a destination service;
  receiving, at the destination service from the mobile device of the customer, a request via the messaging service to authorize the financial transaction, the request comprising the unique checkout ID, the destination service being connected to a second network on an opposite side of the firewall as the first network;
  obtaining, by the destination service, a phone number of the mobile device from the request;
  receiving at a profile management service from the destination service, the phone number of the mobile device, the profile management service being part of the first network;
  retrieving, by the profile management service, from a plurality of sources, publicly available information about an owner of an account associated with the phone number of the mobile device, resulting in multi-sourced publicly known user information;
  generating, by the profile management service, challenge questions based on (1) information in the account, and (2) the multi-sourced publicly known user information; and
  transmitting the challenge questions to the kiosk from by the profile management service;
  displaying the challenge questions on the kiosk;
  receiving, from the mobile device, a response to the challenge questions at the kiosk; and
  logging the customer in with their account ID when the response is verified.

6. The method of claim 5, further comprising:
  calling a registration webservice from the kiosk; and
  receiving, from the registration webservice, the unique checkout ID.

7. The method of claim 6, further comprising
  when the retrieving, by the profile management service, from the plurality of sources, the publicly available information about the owner of the account reveals no account exists, presenting a registration option to the customer.

8. The method of claim 5, further comprising storing the mobile phone number in a table, with the account associated with each mobile phone number in the table.

* * * * *